(12) United States Patent  
Meister

(10) Patent No.: US 6,985,534 B1  
(45) Date of Patent: Jan. 10, 2006

(54) CHANNEL ALLOCATION METHOD AND DEVICE FOR CODED AND COMBINED INFORMATION SETS

(75) Inventor: Wolfgang Meister, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/807,741

(22) PCT Filed: Oct. 27, 1999

(86) PCT No.: PCT/EP99/08134

§ 371 (c)(1),  
(2), (4) Date: Jul. 16, 2001

(87) PCT Pub. No.: WO00/25492

PCT Pub. Date: May 4, 2000

(30) Foreign Application Priority Data

Oct. 27, 1998 (DE) ........................................ 198 49 553

(51) Int. Cl.  
*H04K 1/10* (2006.01)

(52) U.S. Cl. ..................................................... 375/260
(58) Field of Classification Search ................. 375/130, 375/140, 133, 146, 147, 259, 260, 265; 370/203, 370/206, 319, 281, 208, 210  
See application file for complete search history.

(56) References Cited

U.S. PATENT DOCUMENTS 5,867,478 A * 2/1999 Baum et al. ................. 370/203
6,373,859 B1 * 4/2002 Jedwab et al. ............... 370/479
6,501,810 B1 * 12/2002 Karim et al. ................ 375/369
6,580,761 B2 * 6/2003 Laroia et al. ................ 375/260
6,628,722 B1 * 9/2003 Laroia et al. ................ 375/259

FOREIGN PATENT DOCUMENTS

EP         0742654         11/1996

* cited by examiner

*Primary Examiner*—Emmanuel Bayard  
(74) *Attorney, Agent, or Firm*—Glenn Patent Group; Michael A. Glenn

(57) ABSTRACT

In a device for transmitting a sequence of information symbols over a plurality of partial channels having different transmission characteristics and together forming a transmission channel, the sequence of information symbols is grouped (102), whereupon a first set and a second set of the information symbols are coded (103a, 103b) using different coding methods. The coded information symbols are then combined in sets (104a, 104b) and are transmitted over a channel having two sets of partial channels. Both the first and the second set of partial channels have at least one partial channel whose signal-to-noise ratio without combining would be lower than a threshold signal-to-noise ratio which is minimally required by the coding method used for the set to which this partial channel belongs in order to achieve a predetermined reliability when decoding the information symbols and whose signal-to-noise ratio is greater than or equal to the threshold signal-to-noise ratio as a result of the combination step. The concept of transmitting and receiving according to the present invention permits an increased transmission rate since there is at least one partial channel in each set as a result of the setwise combination.

23 Claims, 6 Drawing Sheets

CHANNEL ALLOCATION METHOD AND DEVICE FOR CODED AND COMBINED INFORMATION SETS

DESCRIPTION

The present invention relates to a device and a method for transmitting and to a device and a method for receiving and in particular to a multi-channel concept wherein different coding methods are employed.

The high-rate data transmission in existing telephone networks between the exchange and the terminal is becoming increasingly important with the introduction of new Internet services. For economic reasons only the existing copper cables are available initially for this purpose. However, these were originally dimensioned exclusively for the transmission of low-frequency speech signals and they are characterized by markedly low-pass behaviour. Using appropriate line codes, it is possible to transmit 144 kbits/s over distances of up to about 5 km (ISDN basic access) and, depending on the quality of the cable and the prevailing interference environment, 2 Mbits/s over distances of 2–3 km (ISDN primary group access). These methods employ low-stage, usually ternary or quaternary, coding methods.

Due to the rapid increase in the line attenuation with frequency and the rapid increase in the interference between the individual neighbouring line pairs of a cable these cited methods with their line codes are not, however, suitable for the transmission of still higher bit rates.

For the transmission of higher data rates the many-carrier or multi-carrier methods with spectral matching to the transmission channel, the theory of which has long been known, have been developed recently for practical application.

Through their virtual division of the transmission channel into a plurality of individual partial channels, these methods permit better utilization of the transmission channel.

In the following a description of traditional OFDM (Orthogonal Frequency Division Multiplexing) and DMT (Discrete Multi Tone) methods will first be given in which it is shown that a particular piece of information is transmitted over precisely one carrier frequency, i.e. one partial channel.

The bit error probability of a digital transmission system is mainly determined by the chosen modulation method on the one hand and on the other by the interference superimposed on the received signal at the receiver. The choice of the modulation method here determines the bits which can be transmitted with each modulation symbol. Due to the lower line attenuation and the lower crosstalk between adjacent wire pairs, the partial channels in the lower frequency range exhibit a considerably higher signal-to-noise ratio (S/N ratio; S/N=carrier/noise) at the receiver than do partial channels in the higher frequency ranges. As a result it is possible to transmit more information per modulation symbol in low-frequency partial channels by employing higher-stage modulation methods. This leads to a higher overall transmission rate. In xDSL transmission methods (DSL=Digital Subscriber Line) only $2^x$ QAM modulation methods (QAM=Quadrature Amplitude Modulation) are employed. In these modulation methods a certain number of bits are imposed on a cos carrier and a sin carrier with one frequency by amplitude modulation. The number x of the pieces of information in bits which are imposed on a carrier oscillation when modulating by means of a 2x-stage modulation method is called the bit loading factor or bit loading.

In xDSL methods it is ensured, by appropriate choice of the transmission duration and of the frequency separation of the individual carrier oscillations, that sufficient orthogonality exists between all the carrier oscillations, at least in the case of a distortion-free transmission. It is thus possible to regard the individual carrier oscillations as independent partial channels within the whole transmission channel. The individual sin and cos carrier oscillations are generated not by separate modulation of N separately generated carrier oscillations but collectively by inverse discrete Fourier transform (IDFT) of a vector t with N complex-value components.

FIG. 7 of the present invention shows a traditional OFDM transmission path or a traditional DMT transmission path. The transmission path has a source 700 which emits a sequence of information symbols. By means of a unit 702 for grouping, M information symbols supplied by the source 700 are respectively grouped together and mapped onto the N components of a vector t. In general M is not equal to N and during mapping the choice of modulation method is taken into account by means of a suitable coding, i.e. suitable weighting and allocation to the individual components of the vector t. A particular information symbol is here allocated to just one component of the vector t. The unit 702 for grouping is followed by a unit 704 for imposing the information symbols or the components of the vector t on the corresponding carrier frequencies of the transmission channel. Each component of the vector t is here imposed on just one carrier oscillation by means of an inverse Fourier transform (IDFT). A modulated signal v is obtained, which is transmitted over a distorting transmission channel 706 at the end of which a distorted signal w emerges, the carriers or components of which are differently distorted by the channel depending on their carrier frequency.

The signal w is demodulated by a unit 708 for extracting, i.e. a unit for performing a discrete Fourier transform (DFT), so as to extract the information symbols or the individual carrier oscillations with the imposed information symbols. Then, in a unit 710 for equalizing or in a channel equalizer, the frequency-dependent distortion of the signal caused by the transmission channel is compensated to the extent that is necessary and/or possible so as to obtain an equalized signal z which is converted back into a sequence of information symbols by a unit 712 for revoking the grouping and is passed on to a sink 714 or receiver (the addressee of the message).

The valid standard for the transmission method ADSL (ADSL=Advanced Digital Subscriber Line) provides e.g. for the splitting of the frequency range 26 kHz to 1104 kHz into a total of 248 partial channels with a bandwidth of 4.35 kHz each. For the transmission in the low-frequency partial channels, the standard then provides for the use of a $2^{15}$ QAM modulation method with an information rate or a bit loading of 15 bits/modulation symbol, in contrast to the uppermost partial channels where simply a 4 QAM modulation method with an information rate of 2 bits/modulation symbol is employed. The number of stages of the modulation method employed in the various partial channels decreases in line with the decrease in the S/N ratio with frequency. Overall the result is a gross transmission rate of about 8 Mbits/s within a frequency range of 26 kHz to 1104 kHz, which corresponds to a bandwidth efficiency of about 7.6 bits/Hz. If one adopts the cable configurations cited in the standard, the resulting distance which can be bridged is about 6 km, depending on the line attenuation and the transmitted data rate.

FIG. 8 shows the S/N ratio of the channel, which defines the upper frequency limit of the partial channels, as a function of the frequency, and the usable carrier occupancy for the traditional OFDM or DMT method. The steadily falling curve in FIG. 8 shows the variation with frequency of the S/N ratio resulting from the cable attenuation. An interference noise with constant spectral interference power density $N_0$ is assumed here. The step-shaped decreasing curve shows the usable S/N ratio for a $2^x$ modulation method. The abrupt decline of the step curve results from the fact that even for the low-stage modulation method 4 QAM (or 2 QAM) which is employed a certain minimum S/N ratio is necessary to ensure a particular bit error rate. This value results in part from the desired reliability of the transmission and implementation effort for the FEC (FEC=Forward Error Correction). This minimum S/N ratio for the low-stage modulation method is termed the implementation margin in this description. In FIG. 8 a value of 14 dB has been adopted as an example.

A disadvantage of the method described above is that, despite the spectral efficiency of about 7.6 bits/Hz, the method for the digital signal processing requires a digital-analog and analog-digital conversion with an accuracy of considerably more than 2×7 bits, i.e. a signal space quantization in excess of $2^{15}$, which corresponds to double the actual bandwidth efficiency of the transmission method. This precision is necessary to ensure that the whole of the information transmitted in the lower partial channels can be encoded and decoded without error.

A further disadvantage of the method described above is that the digital-analog and analog-digital conversion must take place at a frequency which is at least twice that of the upper partial channel. There are therefore serious implementation disadvantages.

A further disadvantage of the method described above is that the whole of the signal processing up to the discriminator, e.g. the requisite Fourier transform, must be performed with a numerical precision which is such as to guarantee that any rounding errors which occur do not hinder the error-free recording of the information in low-frequency partial channels.

A further disadvantage of the method described above is that the modulation methods used for the individual partial channels can only be adjusted in steps of powers of 2. Consequently a change from a $2^x$-stage modulation method to a $2^{x+1}$-stage modulation method can only be made when the S/N ratio in the respective partial channel has increased by a factor of 2. A smaller increase in the S/N ratio cannot be exploited.

In the specialist publication "Channel Coding and Modulation for Transmission over Multipath Channels", Jürgen Lindner, AE0, Vol. 49, No. 3, 1995, pp. 110–119, various methods for channel coding and modulation for transmission over multipath channels are described. The work is based on a coded modulation together with a linear block modulation with orthogonal functions. This incorporates normal multi-carrier methods according to the OFDM technique and also the generalization thereof, which is called the OCDM method, the "C" standing for "coding". In the OCDM method the "transmission load" is transmitted over all the OFDM partial channels in that the vector which includes all the symbols for parallel transmission over all the channels is multiplied by a unitary matrix. Each OFDM partial channel thus carries a part of each component of the vector, i.e. of each symbol. A corresponding algorithm on the receive side consists of a matrix multiplication with a matrix which is the complex transposed conjugate of the matrix in the transmitter. Since all the symbols which are transmitted in parallel over a transmission channel are combined with each other, the total noise power of the channel will be uniformly distributed over all the partial channels after an inverse combination in the receiver.

A disadvantage of this method is that it is not applicable to modulation methods described in FIG. 7 and FIG. 8. Because of the different signal-to-noise ratios, different partial channels require different coding methods to ensure that a symbol transmitted over such a channel can be decoded in the receiver with sufficient reliability. A uniformization over the whole transmission channel would thus mean that only the carriers with higher carrier frequencies, for which coding methods which assign relatively little information have been adopted, can be decoded again correctly whereas lower frequency carriers, for which higher-stage coding methods have been adopted, can no longer be decoded correctly because of a violation of the threshold signal-to-noise ratio, i.e. of the signal-to-noise ratio which is minimally needed to achieve a correct decoding of this partial channel with a predetermined reliability, thus resulting in a serious loss of information.

A further problem with the known method of combining all the carriers with each other is that, if a transmission channel has one or more frequency ranges in which there is a very high attenuation and/or a very high interference power, there may be a complete loss of information in the whole transmission channel if the result of the reverse combination in the receiver is an averaged signal-to-noise ratio which falls below a certain value. In other words, just a very few very bad partial channels may cause the bit error rate to fall below a specified minimum value when decoding all the partial channels. The only remedy for this is either to increase the transmitted power in all the partial channels or to employ a coding method which assigns less information to an information symbol in such a way that the threshold signal-to-noise ratio suffices for a decoding with a specified minimum reliability.

These two possibilities are not desirable, however, since an increase in the transmitted power may not be feasible, e.g. when a maximum spectral power density of the transmitted signal or a maximum overall power of the transmitted signal has been specified, or when the application requires a certain minimum transmission rate, which can no longer be achieved using low-stage modulation methods.

It is the object of the present invention to provide a device and a method for transmitting a sequence of information symbols and a device and a method for receiving a transmitted signal which exploit efficiently the available capacity of the transmission signal while being simple to implement.

This object is achieved by a device for transmitting according to claim 1, by a device for receiving according to claim 16, by a method for transmitting according to claim 21 and by a method for receiving according to claim 22.

The present invention is based on the finding that, through uniformization of the noise power density or interference power density or through uniformization of the signal-to-noise ratio in the respective sets of the partial channels of a disturbed transmission channel or by distributing the information for transmission over sets of partial channels of an overall transmission channel, a better exploitation of the available capacity of the transmission channel can be achieved, so that it is possible to increase the reliability of the transmitted information.

The concept according to the present invention is characterized by the fact that the transmission channel is already taken account of when transmitting in that at least two different coding methods are employed which differ as to the amount of information they assign to an information symbol and that the coding methods are taken into account when the coded information symbols from the respective partial sets are combined. As a consequence, only partial channels within a set of partial channels are combined with one another, i.e. only partial channels which have been encoded with the same coding method are combined with each other. The uniformization of the signal-to-noise ratio does not therefore take place over the whole transmission channel but is tailored to the channel or to the different coding methods. As a result of the uniformization in the two partial sets, i.e. the combination of the coded information symbols in the individual sets of partial channels, each set of partial channels has at least one partial channel whose signal-to-noise ratio, without the combination step, would be smaller than a threshold signal-to-noise ratio that is minimally necessary for the coding method used for the set to which this partial channel belongs to obtain a predetermined reliability when decoding the information symbols, and whose signal-to-noise ratio, thanks to the combination step, is greater or equal to this threshold signal-to-noise ratio.

A threshold signal-to-noise ratio will normally be defined such that a decoder in the receiver can decode the coded information symbols with a bit error rate that is below a maximum permissible bit error rate. Naturally this value is variable, depending on the application, according to the quality of the reception required in the receiver.

It should be noted that to employ the method according to the present invention in its most general form, it is not necessary to have exact knowledge of the transmission channel, only a rough idea of the transmission channel is needed which permits a rough evaluation of the threshold signal-to-noise ratio for each partial channel. However, the more accurately the transmission channel is known, or is measured dynamically, the more precisely the different modulation methods and the different sets of partial channels can be adapted to the transmission channel, resulting in a correspondingly higher exploitable transmission rate. In the case of precise knowledge of the transmission channel, the method according to the present invention can thus provide a much higher transmissible information rate than can the prior art. Even when the channel is only very roughly estimated, the present invention can, thanks to the use of at least two coding methods in association with the use of at least two combination specifications, still provide a channel-adapted transmission. The data rate of the transmit/receive concept according to the present invention is increased due to the fact that each set of partial channels contains at least one partial channel whose signal-to-noise ratio, because of combining, is greater than or equal to a threshold signal-to-noise ratio, which means that, for this partial channel at least, a higher-stage coding method can be applied, i.e. more information can be allocated to it, than is so in the prior art, which is represented in FIG. 8. Furthermore, the method according to the present invention permits an increase in the exploitable overall bandwidth of the transmission channel since the at least one partial channel of the second set of partial channels can no longer be used in the known method as, without the combining in the second partial set, the signal-to-noise ratio for this partial channel was already lower than the threshold signal-to-noise ratio.

The method according to the present invention offers considerable flexibility as to how closely the reliability limit is approached when uniformizing the signal-to-noise ratio in a set of partial channels. In other words, the signal-to-noise ratio of the partial channels in a set of partial channels decreases progressively with an increase in the number of partial channels which are involved in the combining process and which without combination would have a transmission quality which would not meet the demands of the coding method for this set of partial channels. A good compromise between transmission rate and reliability can thus always be achieved.

If the signal-to-noise ratio of the partial channels in a set of partial channels is chosen to be very near the threshold signal-to-noise ratio, the number of partial channels in which a higher value coding method can be used is high, as a result of which a correspondingly higher data rate can be achieved, provided the channel is known with sufficient precision. If, on the other hand, the number of partial channels which, compared to the known method, can also be coded with the higher stage coding method is chosen to be small, the signal-to-noise ratio of the partial channels in the set of partial channels lies well above the minimally necessary threshold signal-to-noise ratio. In this case the transmission channel does not have to be known so precisely, since deviations in the transmission behaviour do not directly lead to the signal-to-noise ratio falling below the necessary minimum signal-to-noise ratio and thus to a loss of the information transmitted in this set of partial channels. Even if, in the case of a channel which is poorly known, a "transmission hole" occurs, the worst that can happen is simply a total loss of the set of partial channels in which the transmission hole lies. The partial channels of the at least one other set are not affected, however, since combination did not take place over the whole transmission channel but simply within the sets of partial channels. It is clear that this compromise depends very much on the application.

In the method according to the present invention what can be very simply adapted to the given application is the number of different coding methods and modulation methods employed and the resulting number of sets of partial channels which are used. If the sole optimization criterion of an application is the maximization of the transmissible information rate, i.e. if the available channel capacity is to be exploited optimally without considering any further boundary conditions, the obvious thing to do is to use a larger number of sets of partial channels, thereby achieving optimal spectral matching to the transmission channel. In this case the allocation of the individual channels to the various sets of partial channels is performed in such a way that, while employing sets of partial channels with possibly very different bit loading factors, i.e. coding methods, which may differ markedly as to signal space quantization, depending on the application, the allocation achieves optimal matching to the transmission channel and a maximum transmissible information rate. However, this sometimes has the disadvantage that very precise A/D converters or arithmetic units are needed. If the optimization criterion of the application is specified to be the simple implementation of the signal processing units in the transmitter and receiver, however, the method according to the present invention offers the possibility of transmission channel matching by using a minimum of 2 sets of partial channels with different coding methods, e.g. with a first set of partial channels in which a $2^2$ QAM method is used as the coding method and a second set of partial channels in which a $2^3$ QAM method is used. The method according to the present invention, through uniformization, makes it possible to extend the usable transmission frequency range compared with that in the prior art and thus to increase the transmissible information rate compared with methods according to the prior art.

The present invention also provides a high degree of flexibility as regards the occupancy of the sets of partial channels. For a transmission with maximum data rate, the number of sets of partial channels will correspond to the number of maximum possible coding methods. If the requirement is for simple implementability, e.g. the use of A/D and D/A converters with a coarse amplitude quantization, simple implementation of the numerical signal processing or the permissibility of larger linear or non-linear signal distortions, the number of sets of partial channels will be minimal and only coding methods with coarse quantization of the signal space will be used. In the extreme case, the number of sets of partial channels will be the same as the required minimum number of 2 and two different coding methods, in the extreme case a $2^2$ QAM and a $2^3$ QAM method, will be used for coding purposes, it being possible to specify the upper frequency limit of the first set of partial channels or the lower frequency limit of the second set of partial channels according to the requirement. If the aim is to achieve the highest possible data rate, the upper frequency limit of the first set of partial channels is chosen to be as high as possible such that all the partial channels of the first set of partial channels have only a small implementation margin in terms of the threshold signal-to-noise ratio determined by the coding method. The accuracy with which this can be performed is determined by the accuracy with which the transmission behaviour of the overall channel is known.

If it is known that a transmission channel has partial channels with poor or very poor transmission behaviour, the obvious thing to do is to exclude these partial channels from the allocation to the sets of partial channels and thus from the transmission. A different bunching of the sets of partial channels, depending on their exact transmission behaviour, combined with an extension of the exploitable frequency range of the transmission channel, thus becomes possible.

The method according to the present invention thus also provides flexibility in that it is not necessary to combine the information symbols of all the carriers, as in the prior art, but that partial channels or carriers between two sets of partial channels can be left "untreated" or are not supplied with information of any kind. This concept can also be extended in that a number of bands are not combined in a transmission channel.

Finally, the transmit/receive concept according to the present invention is applicable not just to multi-carrier methods, such as the OFDM method, but also to other coding methods and modulation methods and also other transmission channels having partial channels with different transmission behaviour, i.e. different transmission quality, e.g. to classical coding methods with different-stage pulse amplitude modulation methods and to transmission channels with time-dependent transmission behaviour, i.e. channels where the transmission quality of the individual partial channels varies with time. Examples are the radio channel and the various propagation modes on a 4-wire line.

An advantage of the present invention is that it makes possible a better utilization of the capacity of the transmission channel or of the partial channels of the transmission channel and thus a higher transmission rate, in particular when the permissible spectral power density of the transmitted signal or the total power of the transmitted signal is limited.

A further advantage of the present invention is that the part of the transmission rate gained by the present invention can be used fully or partially as additional redundancy so as to increase the reliability of the transmission.

A further advantage of the present invention is that the increase in the available transmission rate in the whole transmission channel, or in partial channels of the transmission channel, for a given transmission rate can be used to reduce the maximum necessary bit loading factor, so that the implementation outlay and the costs e.g. of the A/D and D/A conversion as well as the outlay needed for the numerical signal processing can be reduced.

A further advantage of the present invention is that suboptimal systems with very low bit loading factors and large bandwidth efficiency can be realized for the transmission of information over linearly distorting disturbed channels.

A further advantage of the present invention is that signals with lower bit loading factors can be used, which makes it possible to employ a coarser-stage amplitude quantization and, consequently, to tolerate greater linear or non-linear signal distortions.

Preferred embodiments of the present invention are described in detail below making reference to the enclosed drawings, in which FIG. 1 shows a schematic block diagram of the transmit/receive concept according to the present invention using the example of a multi-carrier modulation by means of the OFDM method;

Figure 1:
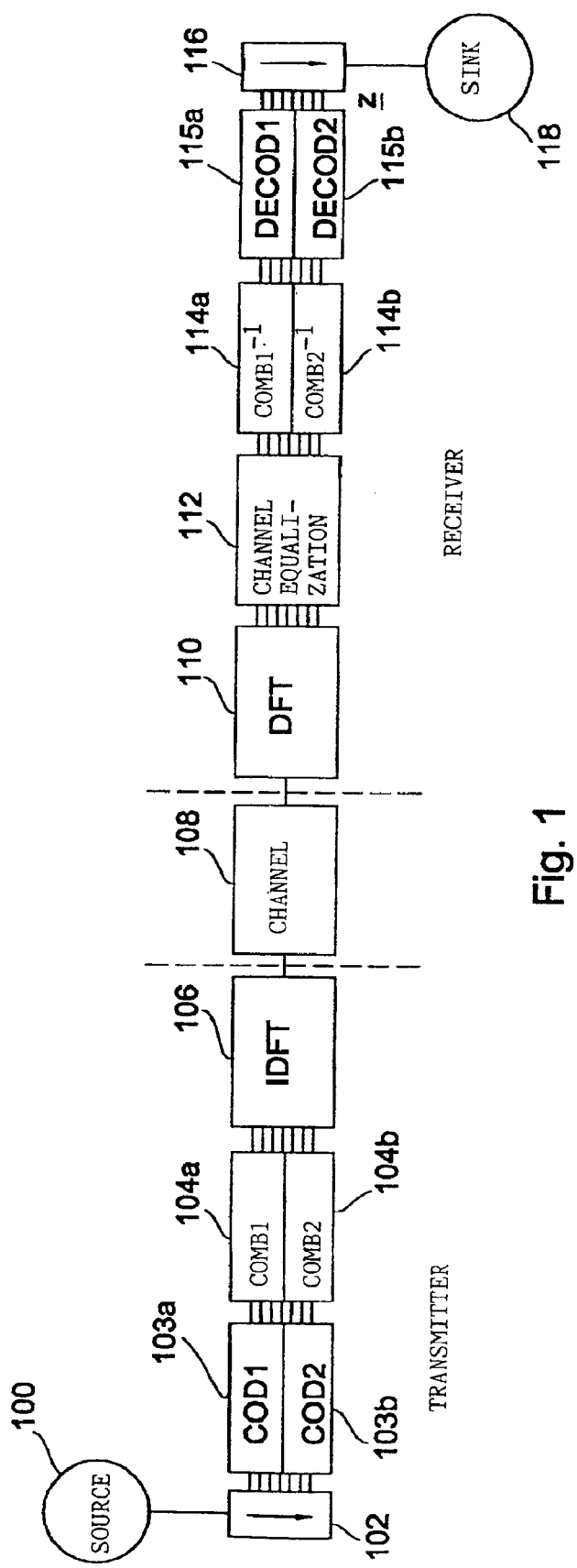

FIG. 1 shows an overall view of the transmit/receive concept according to the present invention. On the left hand side of FIG. 1 there is a device for transmitting information from a source 100, which has a unit 102 for grouping the information and converting it into signal values, most generally for serial/parallel conversion, which correspond to the subsequently used coding methods, and a first coding unit 103a, a second coding unit 103b, a first combination unit 104a, a second combination unit 104b and also a unit for allocating the combined coded information symbols to the partial channels, which in the case of an OFDM method might be a unit for performing an inverse discrete Fourier transform, which is designated in FIG. 1 by the reference numeral 106.

As will be explained later, the first and the second coding methods, and when there are more than two coding methods the further coding methods, allocate to the respectively generated coded information symbols certain, coding method related, amounts of information. In the exemplary case, where the information is in the form of bits, the amounts of information differ in the number of bits. The unit 102 for grouping will then distribute the information bits among the partial channels in such a way that, for each partial channel, the number of information bits required for the coding method employed, are grouped together. If partial channels are subjected e.g. to a $2^2$ QAM coding method, the grouping unit will supply each of these partial channels with 2 information bits. If, on the other hand, partial channels are subjected e.g. to a $2^5$ QAM coding method, the grouping unit will supply each of these partial channels with 5 information bits. The coded information symbol, which is generated by the encoder, thus has an amount of 2 information bits allocated to it in the first case and an amount of 5 information bits in the second case. The grouping unit therefore performs the function of allocating to each of the used partial channels the amount of information which the coding method employed for the respective partial channel requires it to have.

The output signal of unit 106 is transmitted over the channel 108 to the input of the receiver. This channel can take different forms, e.g. it might be a cable channel in the form of a telephone line or power supply line, or it might be a radio channel. In these cases it would be necessary to supplement FIG. 1 with units for matching the transmitted signal and the received signal to such a channel. Transmission over the channel causes the signal to be attenuated and distorted. In addition, various types of interference are additively imposed on the signal. The output signal of the channel, denoted by w, forms the input signal of the unit 110 of the receiver.

The receiver includes a unit 110 for extracting the received symbols and allocating them to the individual partial channels. In the OFDM case shown here this is a unit which performs a discrete Fourier transform. It is followed by a channel equalizer to bring all the partial channels, irrespective of the individual signal attenuations occurring during transmission, to the same level. The channel equalizer 112 is followed by a first unit for performing an inverse combination 114a and a second unit for performing an inverse combination 114b, the outputs of which in turn are connected to a first decoder 115a and a second decoder 115b, which, on the output side, supply decoded information symbols which are converted, by a unit 116 for parallel/serial conversion of the decoded information symbols, into a serial data stream which can then be fed to an information sink 118.

If the transmission is secured by methods for forward error correction (FEC: Forward Error Correction) or by methods for automatically repeating the transmission (ARQ: Automatic Request) or a combination of such methods, the obvious places to locate the required units are between the units 102 and 103a and 103b on the transmit side and between the units 115a and 115b and 116 on the receive side.

By definition the partial channels which are encoded by the first encoder 103a are referred to as the first set of partial channels. In the very schematic example shown in FIG. 1, in which there are only seven partial channels, the first four partial channels seen from the top form the first set of partial channels with the numbers 1 to 4. The last three partial channels form the second set of partial channels, i.e. the partial channels with the numbers 5, 6 and 7.

The two encoders 103a and 103b differ in that the amount of information which they respectively assign to a coded information symbol differs. Whatever modulation method is used in a set of partial channels, this assignment is made as follows: a certain number of information symbols of unit 102 are combined and the corresponding partial channel from the set of partial channels has a corresponding (dependent on the quantization of the signal space by the modulation method) generally complex-value signal value assigned to it at the corresponding output. The number of outputs of the encoder 103a corresponds to the number of partial channels in the first set of partial channels and normally differs from the number of assigned inputs, the difference depending, for each set of partial channels, i.e. for each encoder, on the particular modulation method chosen for the partial channel. In the case of the QAM modulation method used for a transmission according to the ADSL standard, the two encoders 103a and 103b differ in that QAM methods with different quantization of the signal space are used, something which is described in terms of different bit loading factors in the description of the ADSL standard. For example, if a $2^x$ QAM modulation method is used in the first set of partial channels, the encoder 103a might always consider x information symbols together and, dependent on these, generate one of $2^x$ possible signal levels for the output signal of the associated partial channel, while the encoder 103b would then always combine (x-y) information symbols for the second set of partial channels and, depending on these, generate another of $2^{(x-y)}$ possible signal levels at the output of the associated partial channel.

The two combiners 104a, 104b effect a combination of the partial channels in the respective set of partial channels. Mathematically this combination can be described for each of the combiners 104a and 104b as the matrix multiplication of a vector t of respective input signals with a matrix P, resulting in a respective vector of output signals for the corresponding set of partial channels. The matrices of the various combiners can differ individually or be the same. The exact choice of combination specifications or the respective matrices P of the combiners 104a and 104b must be undertaken in conformity with the inverse combination specifications of the receiver units 114a and 114b, and, as will be shown, orthogonal and normalized, i.e. orthonormalized or complex unitary matrices, offer advantages. Through this combination every item of information of each output signal of the encoder 103a or 103b is impressed on each output signal of the respective combiner 104a or 104b, i.e. each item of information of each partial channel of the respective set of partial channels is impressed on each partial channel of the respective set of partial channels. Here the power distribution of each coded symbol of each partial channel should normally be uniform among the individual partial channels of the sets of partial channels. Even if only one combination specification is always referred to in the following, what is said applies to both combination specifications or, in the general case, to each of the n combination specifications involved.

The transmit/receive concept shown in FIG. 1 is also referred to hereinafter as the COFDM transmission path (COFDM=Coded Orthogonal Frequency Division Multiplexing). This is suitable for a DSL channel but can also be employed for other channels with partial channels which differ as to their transmission characteristics.

The sequence of information symbols is grouped, in a unit 102 for grouping the sequence of information symbols, into a group of information symbols per partial set and is then encoded per partial set to obtain a vector t of coded information symbols for each partial set. The number of elements or coded information symbols of this vector t corresponds to the number of partial channels of the respective set of partial channels, in the case of a COFDM method the number of transmission channel carriers or carrier frequencies used in this partial set.

The vector t is then processed per partial set in a unit 104a or 104b for combining the coded information symbols of the vector t according to a combination specification. These units 104a, 104b for combining may e.g. map the vector t onto some other vector u via a respective matrix P. In this mapping the individual elements or coded information symbols of the vector t are combined together to create a number of combined information symbols or elements of the vector u equal to the number of carriers or partial channels in this set of carriers or partial channels. The combination specification distributes the information of the individual coded information symbols among the combined coded information symbols. This distribution might be effected e.g. by mapping the vector t onto the vector u via an orthogonal and normalized, or orthonormal, matrix P.

It should be noted that the present invention does not require the combination matrices for the sets of partial channels or carriers to be exactly orthonormal; all that is necessary is a sufficient degree of orthonormality, although it is likely that the best results when undoing the combination in a set of partial channels will be achieved for highly orthonormal matrices.

The matrix P here may e.g. be a Hadamard matrix or a PN matrix (PN=Pseudo-Noise=a matrix derived from a random sequence) or some other sufficiently orthonormal matrix which is inverse to the matrix Q of the associated unit (114a, 114b).

The vector of the combined coded information symbols u is then submitted to a unit 106 for impressing the combined coded information symbols, i.e. the elements of the vector u, onto the corresponding partial channels or carriers of the sets of partial channels or carriers to create a modulated signal which represents the sequence of information symbols. This signal is denoted by a vector v. In the case of COFDM methods e.g. the unit 106 for impressing the information symbols performs an inverse discrete Fourier transform (IDFT).

The modulated signal v is then transmitted over a transmission channel 108 with a frequency response a(f), e.g. a DSL channel or some other wired channel such as a telephone line or a power supply line or some other channel with a frequency dependent transfer function and/or frequency dependent channel interference noise, such as a radio channel. The present invention is not, however, restricted to channels whose individual partial channels have different carrier frequencies. The present invention is suitable for all transmission channels which have partial channels with different transmission characteristics.

At the end of the channel a signal, possibly distorted by the channel, is received, on which various types of interference have been additively superimposed. A vector w representing the signal is fed into a unit 110 for extracting the combined coded information symbols from the modulated signal or the vector w using the plurality of orthogonal or at least sufficiently orthogonal carriers. The unit 110 for extracting now performs the inverse operation of unit 106 for impressing, i.e. for the COFDM method e.g. a discrete Fourier transform (DFT) or some other transform which is sufficiently inverse to the operation performed by unit 106. The result of the extraction is a vector x whose elements are the combined coded information symbols assigned to the individual partial channels or, in the case of COFDM, to the individual carriers.

The unit for extracting knows, e.g. through specification when designing the transmission system or through auxiliary information in the received channel or in a separate auxiliary channel, how the transmission channel was subdivided into the sets of partial channels in the transmitter. On the output side it supplies the input signals for the at least two inverse combiners (114a, 114b), which in turn feed the at least two decoders (115a, 115b), as is shown in FIG. 1.

If the channel is not disturbed or distorted, the vector x is the same as the vector u. The elements of the vector x, i.e. the individual partial channels, in the case of COFDM e.g. according to the respective assignment to a carrier of the transmission channel, are, however, disturbed differently by a frequency dependent attenuation of the channel and by additively superimposed types of interference and furthermore a disturbance due to white interference noise is superimposed on the individual components of the vector. Through the preceding combination of the information symbols in unit 104 for combining, the information symbols of the group of information symbols or of the vector t are e.g. distributed uniformly or nearly uniformly over all the combined information symbols, e.g. the elements of the vector u. Although the combined coded information symbols are disturbed and distorted differently by the channel, depending on the carrier, the original coded information symbols of the group of information symbols can be equalized by the channel equalization in block 112 in such a way that the output signal of the channel equalizer has a constant power density as a function of frequency, something which will be described in more detail later.

The demodulated signal or the vector x of the received combined coded information symbols is thus fed into a channel equalizer 112 which e.g. equalizes the frequency response a(f) of the channel. After the channel equalizer 112 the demodulated equalized signal or the vector y is fed, depending on the partial set, into a unit 114a or 114b for processing the combined information symbols. The processing specifications of these units 114a, 114b for processing are inverse to the combination specifications of the units 104a, 104b for combining so as to reverse the combinations in the partial sets and so as to be able to extract the coded information symbols of the sequence of coded information symbols from the combined coded information symbols.

The processing specification of the unit 114a, 114b is a reversal or approximate reversal of the combination specification of the unit 104a, 104b, i.e. e.g. a matrix operation with an orthonormal or sufficiently orthonormal matrix Q which is inverse or nearly inverse to the matrix P, i.e. where Q is approximately $P^{-1}$, such as e.g. an inverse Hadamard matrix, an inverse PN matrix or some other sufficiently orthonormal matrix. What emerges again finally is the sequence of coded information symbols, referred to here as vector z.

As can be seen from FIG. 1, the coded information symbols of each set are now fed into their respective decoders 115a, 115b, which, broadly speaking, reverse the coding of the equivalent encoders 103a, 103b in so far as the superimposed interference allows.

A unit 116 for revoking the grouping then converts the group of information symbols into a sequence of information symbols again which are received by a receiver or a sink 118.

In the following FIG. 2 will be considered. This shows a section of a transmission channel or a transmission channel, which for the sake of example just extends from 4.5 MHz to 5.5 MHz. A curve 200 shows the frequency dependent carrier noise power as a function of frequency which results after equalization of the frequency dependent attenuation of the transmission channel by the unit 112. For the example considered here, where the transmitted power is constant over all carriers, where the transmission channel has an attenuation which increases with frequency and where the thermal noise is independent of frequency, curve 200 results after the transmission channel has been normalized in the receiver in such a way that the total power is constant with respect to frequency. Expressed simply, the transmitted signal in the transmission channel is attenuated more and more as the frequency increases. Channel equalization leads to an amplification of the signal power, and thus also of the noise power, which means that, although the noise of the receiver is constant with respect to frequency, the carrier noise power increases with the frequency, this corresponding to a signal-to-noise ratio which decreases as the frequency increases. The concept according to the present invention is not, however, confined to a channel with a monotonically decreasing signal-to-noise ratio, but applies to any sort of channel where the transmission quality is distributed over the partial channels.

Th basic idea of the present invention will now be described in more detail by means of FIG. 2. In this figure the noise power distribution within a certain frequency range is shown for the case where the channel 108 in FIG. 1 is equalized by the channel equalizer 112 in such a way that the overall transfer function has a constant value. Such an equalization of the frequency response necessarily entails an increase in the spectral noise power in the upper frequency range. This increase in the spectral noise power density is shown in FIG. 2. Also shown is the permissible spectral noise power density for a particular transmission method. Since this power density depends only on the chosen coding method or modulation method and the permissible transmission error probability, the result in the diagram is a constant value independent of the frequency. It should be noted that the permissible transmission error probability corresponds to a predetermined reliability when decoding the information symbols.

Below a certain frequency $F_G$ the actual noise power density is less than the permitted value. This results in a higher than necessary reliability of the coded information symbols which are transmitted in this frequency range by means of $2^x$ QAM or some other coding method.

In methods according to the prior art it is not, however, possible to make the transition to a higher-stage $2^{x+1}$ QAM coding method, i.e. to a coding method which assigns more information to a coded information symbol and thus has a finer quantization of the signal space, since this entails a reduction in the noise power density by a factor of 2 in the case of QAM coding. This only occurs below the frequency $F_0$. In methods according to the prior art a $2^x$-stage coding method can no longer be employed above the frequency $F_G$ since the coded information symbols cannot be transmitted with the required reliability due to the higher than permissible spectral noise power density. In this frequency range a $2^{x-1}$ QAM coding method must be used in the prior art.

According to the present invention a uniformization of the spectral noise power density as a function of frequency is now achieved by additional orthogonal transformations using one of the orthonormal (orthogonal and normalized) matrices P and Q, see FIG. 1 units 104a and 104b and 114a and 114b. This is achieved by permitting the noise power density to increase up to the maximum permissible value for a $2^x$ QAM coding method for partial channels above $F_0$ and below $F_G$, while above $F_G$ on the other hand the noise power density up to a frequency $F_{G1}$ can be lowered to the maximum permissible value. By transforming an information vector using the matrix Q, each item of information is here impressed on all the coded combined information symbols, i.e. on all the partial channels within the set of partial channels under consideration, by the units 104a and 104b. The set of partial channels considered in FIG. 2 thus stretches from a carrier with the frequency $F_0$ up to a carrier with the frequency $F_{G1}$ for the method according to the present invention, in contrast to methods according to the prior art, which only use the range up to the frequency $F_G$. It should be noted that in the prior art the partial channels between $F_G$ and $F_{G1}$ had to be coded with a low-stage coding method-whereas according to the concept according to the present invention these carriers can be coded with the same coding method as the carriers in the range from $F_0$ to $F_G$ which results in a gain in the available transmission rate.

The net gain in the available transmission rate effected by the present invention corresponds to the difference between the amount of information which is assigned by the two coding methods multiplied by the number of carriers, i.e. partial channels, in the range from $F_G$ to $F_{G1}$.

In the receiver a corresponding reverse transformation is now needed. This reverse transformation is accompanied by a weighted addition of the interference amplitudes of the individual modulation symbols. If the reverse transformation matrix, e.g. the matrix Q in FIG. 1, possesses the property that all the elements of each line have the value 1, i.e. if the matrix Q is orthonormal or unitary, the weighted addition of the noise interference contributions results in an averaging. Consequently it is possible to use a particular $2^x$ coding method for the transmission beyond the frequency $F_G$ for carriers up to the frequency $F_{G1}$ The difference between the rate efficiency of the $2^x$ modulation method and the rate efficiency of the $2^{M-1}$ QAM modulation method otherwise used in the frequency range $F_G \ldots F_{G1}$ multiplied by the bandwidth $F_{G1}-F_G$ thus gives the rate gain which can be achieved by the present invention, as has already been stated.

The uniformization of the superimposed noise power by means of an orthonormal transformation will now be explained in more detail. It should be noted that the following derivation applies to every set of partial channels or carriers individually and that there is no uniformization beyond set boundaries.

The transmitted signal existing as a vector t with complex components is transformed into the vector u by means of an orthonormal matrix P.

$$\underline{u} = P \underline{t} \qquad (1)$$

Through this transformation according to equation (1) and the orthonormality properties of matrices (cf. Equation 3), each component of the vector t is mapped uniformly onto all the components of the vector u, i.e. each individual bit of information of a component t(i) is impressed onto all the components of the vector u and is thus transmitted in all the partial channels or on all the carrier frequencies of a set.

A characteristic of orthonormal or unitary matrices, such as the matrix P, is the mathematical property that when the vector t is transformed the power it contains is preserved regardless of how it is distributed among the individual components.

The following equation thus holds for every component of u, p(u[j]) being the power of the j-th component of the vector u:

$$p(u[j]) = u[j]u[j]^* = \frac{1}{N}\sum_{i=0}^{N-1} t[i]t[i]^* \tag{2}$$

This can e.g. be achieved for matrices with real coefficients by requiring that $$|p_{ij}|=1 \forall i,j \tag{3}$$

Matrices which fulfil this requirement are e.g. Hadamard matrices and PN matrices.

The Hadamard matrix $H_2$ of rank 2 is defined as follows:

$$H_2 = \frac{1}{\sqrt{2}}\begin{bmatrix} 1 & 1 \\ 1 & -1 \end{bmatrix} \tag{4}$$

Hadamard matrices of rank $2^{n+1}$ can be formed from this using the following recursion formula:

$$H_{2^{n+1}} = \frac{1}{\sqrt{2}}\begin{bmatrix} H_{2^n} & H_{2^n} \\ H_{2^n} & -H_{2^n} \end{bmatrix} \tag{5}$$

PN matrices (PN=Pseudo Noise) are formed from a $2^{n}-1$ symbol long section of a (binary) PN sequence. The first row (or also the first column) of the matrix corresponds here to the $2^{n}-1$ long section of the sequence, the other rows resulting from cyclic displacement of the respective preceding row (or column). This cyclic displacement furthermore results in a cyclic matrix, which brings advantages in terms of the practical implementation. For a sequence of length N=7 the sequence is e.g. a pseudo-random sequence.

$$\alpha(v)=(1,1,-1,-1,1,-1,1) \tag{6}$$

This results in the following PN matrix of rank 7:

$$A = \begin{bmatrix} 1 & 1 & -1 & -1 & 1 & -1 & 1 \\ 1 & 1 & 1 & -1 & -1 & 1 & -1 \\ -1 & 1 & 1 & 1 & -1 & -1 & 1 \\ 1 & -1 & 1 & 1 & 1 & -1 & -1 \\ -1 & 1 & -1 & 1 & 1 & 1 & -1 \\ -1 & -1 & 1 & -1 & 1 & 1 & 1 \\ 1 & -1 & -1 & 1 & -1 & 1 & 1 \end{bmatrix} \tag{7}$$

Depending on which orthonormal matrix P, see FIG. 1, was used in the transmitter for the transformation, the corresponding inverse matrix $Q=P^{-1}$ must be used in the receiver. These inverse matrices are also, in general, orthonormal matrices.

For Hadamard matrices e.g. the corresponding inverse is the Hadamard matrix itself.

$$P=H_{2^n} \Longrightarrow Q=P^{-1}=H_{2^n}^{-1}=H_{2^n} \tag{8}$$

For cyclic PN matrices the inverses are again cyclic PN matrices.

$$Q = P^{-1} = \begin{bmatrix} b_0 & b_6 & b_5 & b_4 & b_3 & b_2 & b_1 \\ b_1 & b_0 & b_6 & b_5 & b_4 & b_3 & b_2 \\ b_2 & b_1 & b_0 & b_6 & b_5 & b_4 & b_3 \\ b_3 & b_2 & b_1 & b_0 & b_6 & b_5 & b_4 \\ b_4 & b_3 & b_2 & b_1 & b_0 & b_6 & b_5 \\ b_5 & b_4 & b_3 & b_2 & b_1 & b_0 & b_6 \\ b_6 & b_5 & b_4 & b_3 & b_2 & b_1 & b_0 \end{bmatrix} = \tag{9}$$

$$\begin{bmatrix} a_0 & a_6 & a_5 & a_4 & a_3 & a_2 & a_1 \\ a_1 & a_0 & a_6 & a_5 & a_4 & a_3 & a_2 \\ a_2 & a_1 & a_0 & a_6 & a_5 & a_4 & a_3 \\ a_3 & a_2 & a_1 & a_0 & a_6 & a_5 & a_4 \\ a_4 & a_3 & a_2 & a_1 & a_0 & a_6 & a_5 \\ a_5 & a_4 & a_3 & a_2 & a_1 & a_0 & a_6 \\ a_6 & a_5 & a_4 & a_3 & a_2 & a_1 & a_0 \end{bmatrix}^{-1}$$

For the present invention it is advantageous if the matrix $Q=P^{-1}$ in the receiver exhibits the best possible orthonormal properties, i.e. that, independently of the power distribution of the components in y, the following relation holds true, p(z[j]) standing for the power of the component j:

$$p(z[j]) = z[j]z[j]^* = \frac{1}{N}\sum_{i=0}^{N-1} y[i]y[i]^* \tag{10}$$

This can, as for the matrix P in the transmitter, be achieved by requiring that $$|q_{ij}|=1 \forall i,j \tag{11}$$

In general the inverse of an orthonormal matrix is again an orthonormal matrix. In this case one of the two matrices can be chosen freely, the other matrix resulting accordingly. If only approximately orthonormal matrices are used, however, a specific assignment of the matrices to P and Q can bring advantages.

The fulfilment or approximate fulfilment of the requirement of orthonormality of the matrix Q permits the uniformization of the spectral noise power density or interference power density within a set of partial channels described hereafter. The following remarks apply therefore to each set of partial channels which is subject to a combination by means of a combination specification.

Assuming that, under practical boundary conditions, the interference noises of the individual channels are uncorrelated, the resulting interference noise in the k-th component of the output vector z is given by and $$z_{Stör}=Qy_{Stör} \tag{12}$$

and $$|q_{ij}|=1 \forall i,j \tag{14}$$

$$z_j = \frac{1}{\sqrt{N}}\sum_{i=0}^{N-1} q_{ij}y_i \tag{14}$$

The interference power of the j-th component of the vector z is given by $$p(z[j]) = z[j]z[j]^* = \frac{1}{N}\sum_{i=0}^{N-1} y[i]y[i]^* \qquad (15)$$

Since the index i in equation (15) can be chosen at will, it follows immediately from equation (15) that the interference powers of all the components of z are the same, i.e.

$$p(z[i]) = \frac{1}{N}p(y) = \frac{1}{N}\sum_{i=0}^{N-1} y[i]^2 \qquad (16)$$

This uniformization of the noise power in the partial channels under consideration is a mathematical property of orthonormal matrices.

Figure 2:
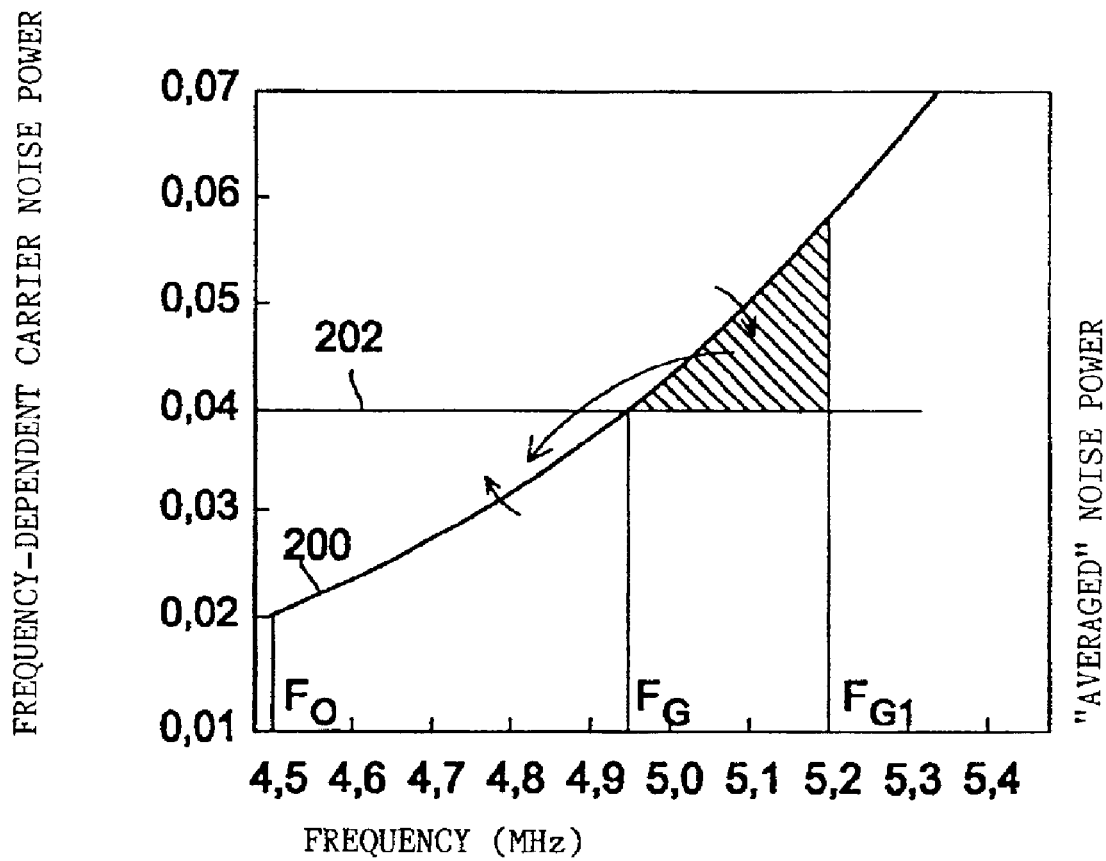
FIG. 2 shows a graphic representation of the bandwidth gain from the transmit concept according to the present invention.

The uniformization described for the example of an isolated partial channel in FIG. 2 makes an overall shift to higher frequencies possible in the allocation of the individual partial channels.

Figure 3:
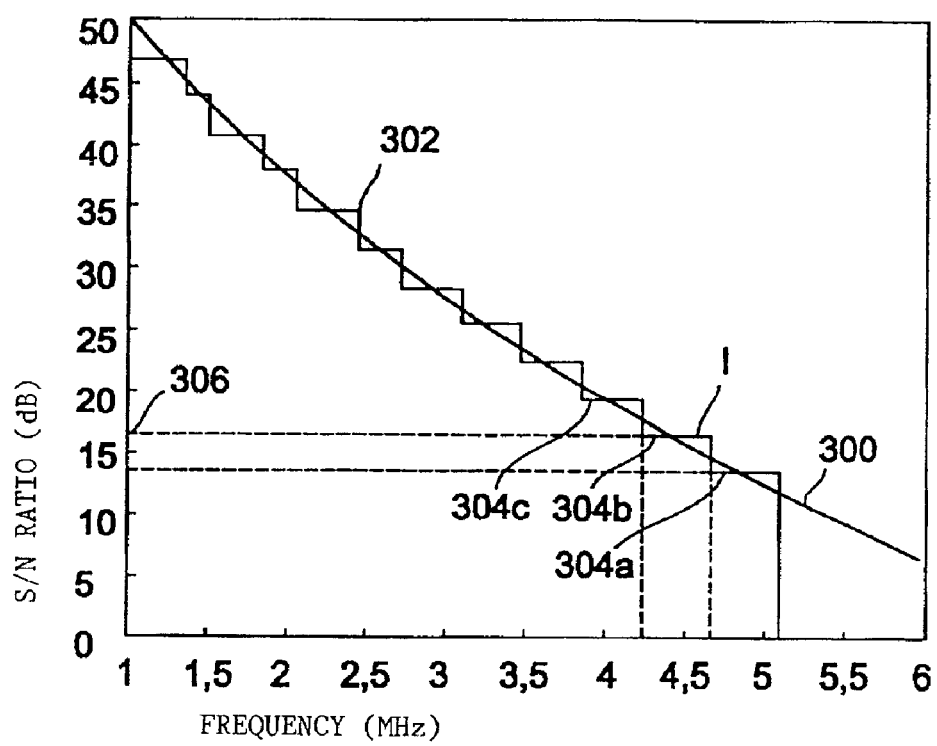
FIG. 3 shows the minimum signal-to-noise ratio of the transmission channel for a certain receive reliability as a function of the frequency and also the threshold signal-to-noise ratio of the different coding methods and the usable carrier occupancy according to an embodiment of the present invention.
Figure 8:
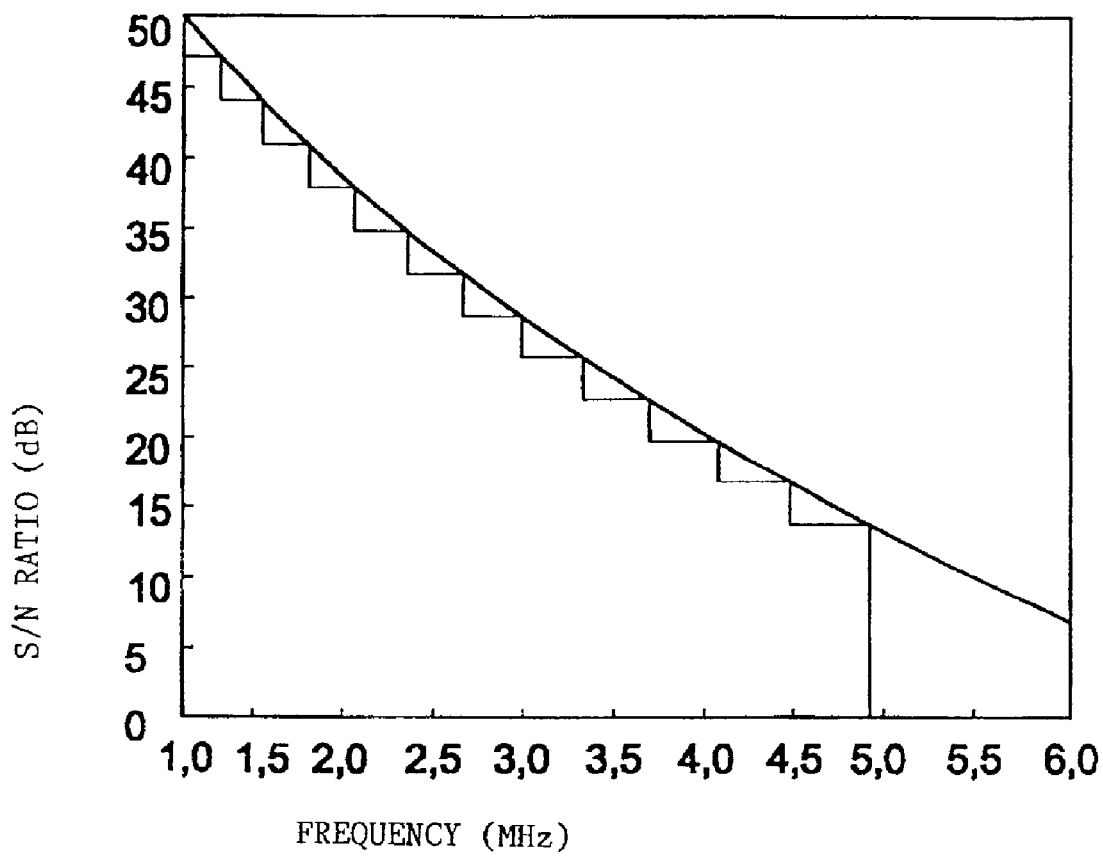
FIG. 8 shows the minimum signal-to-noise ratio of the transmission channel for a certain receive reliability as a function of the frequency and also the threshold signal-to-noise ratio of the different coding methods and the usable carrier occupancy according to the known OFDM concept of FIG. 7.

FIG. 3 shows the frequency dependent S/N ratio, which determines the upper frequency limit of the partial channels in traditional OFDM methods and the utilizable carrier occupancy in the concept according to the present invention or the way in which the maximum possible bit loading factor varies with frequency in the preferred embodiment of the present invention. From FIG. 3 it can be seen how the upper frequency limits of the individual sets of partial channels have extended themselves beyond the monotonically decreasing curve for the S/N ratio. This curve determines the upper frequency limit of the partial channels in traditional methods (FIG. 8).

FIG. 3 shows a partitioning of a transmission channel in 12 sets of partial channels, of which only the first three have been labelled 304a to 304c. In particular the set of partial channels labelled 304b in FIG. 3 comprises partial channels with carrier frequencies from about 4.3 to 4.75 MHz. It is assumed that, for the set of partial channels comprising the partial channels with the highest carrier frequencies, labelled 304a in FIG. 3, a $2^2$ QAM method is used. It is furthermore assumed that a $2^3$ QAM method is used for the set 304b of partial channels. As a result of the S/N ratio vs. frequency for the channel 300, there is a threshold S/N ratio 306 of about 17 dB for the coding method used for the set 304b of partial channels. The carriers in the set 304b of partial channels must therefore have a S/N ratio at least equal to the threshold S/N ratio in order that a predetermined reliability can be achieved when decoding the information symbols. Analogously, the threshold S/N ratio for the set 304a of partial channels is about 14 dB. There is thus a particular threshold S/N ratio for each set of partial channels, i.e. for each coding method which is used. As can be seen from FIG. 8, the carrier occupancy according to the prior art was subject to the requirement that the carrier with the highest frequency in a set of carriers had a S/N ratio greater than or equal to the threshold S/N ratio.

In contrast, the sets of partial channels according to the present invention include at least one partial channel whose S/N ratio without combination is smaller than the threshold S/N ratio and which, as a result of combination, is greater than or at least equal to this threshold S/N ratio. The advantage of this is that this partial channel can be coded with the next higher coding method compared to the prior art.

This at least one partial channel forms a range I which extends above the curve 300. If this partial channel is compared with the situation without combination shown in FIG. 8, it can be seen that a partial channel in the range I of the set 304b has a higher S/N ratio as a result of combination in the partial channel, as a consequence of which this partial channel in the example shown in FIG. 3 can be coded not with the lowest stage coding method but with a coding method one stage higher, which means that the data rate of the system has increased compared to the prior art, as has already been described.

Figure 4:
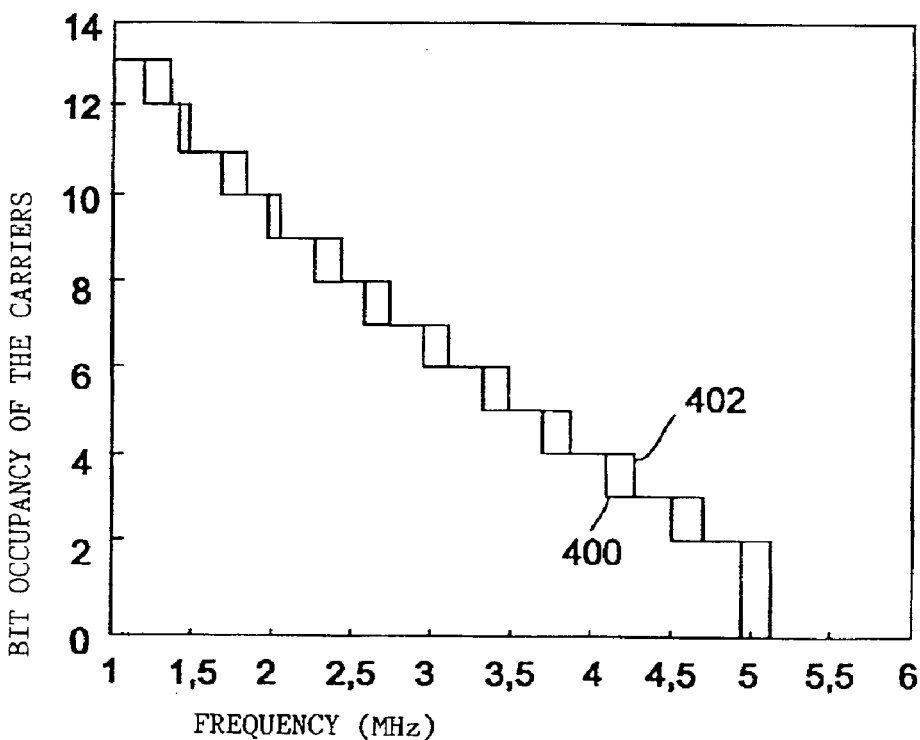
FIG. 4 shows a comparison of the carrier occupancy according to the present invention, shown in FIG. 4, and the carrier occupancy in the traditional DMT method, sketched in FIG. 8.

FIG. 4 shows a comparison of the carrier occupancy for the traditional DMT method and for the COFDM method according to the present invention. FIG. 4 shows the resulting distribution of the bit loading factors vs. frequency for the traditional and the novel method. The rate gain can be read directly from the figure, being the area enclosed by both curves along the staircase. The enclosed area corresponds to the channel capacity which cannot be exploited directly with traditional methods.

The gain in the transmission rate which can be achieved in this way can be used both to increase the transmissible useful information rate and to improve the reliability of the transmission when using error security methods such as FEC or ARQ (ARQ=Automatic Repeat Request in the event of a transmission error). A combination of the two goals, i.e. an increased information rate allied to a redundancy coding, may also make sense in certain applications. In FEC methods an error correction is achieved by means of additional redundancy which is transmitted together with the information. For realistic S/N boundary conditions just part of the additional transmission rate gained is sufficient to compensate with an FEC for the loss in reliability of the modulation symbols in the frequency range $F_0$ to $F_G$ due to frequency-range uniformization. It should be stressed that the S/N ratio of these carriers is in any case only lowered to the permissible limit but not below this. The part of the rate gain which is not needed for the FEC is available as net rate gain.

This may be explained by referring to FIG. 2. In FIG. 2 the S/N ratio at the receiver input is shown as a function of the frequency. If the available frequency range is subdivided into N sets of partial channels in the range $F_0 \ldots F_{G1}$, each of these N sets of partial channels has its own S/N ratio. The noise power density within these sets of partial channels can be assumed to be constant. Within a set of partial channels one or more carriers with their impressed coded combined information symbols can be transmitted, it being assumed that the transmission is a binary one (bit loading factor 1) and that the modulation symbols are to be transmitted with a certain reliability $p \leq p_{max}$. Only the frequency range f greater than or equal to $F_0$ will be considered.

In traditional methods each individual symbol, i.e. each individual carrier in the case of DMT, is considered in isolation in the discriminator of the receiver. This requires that each partial channel or carrier must have a certain S/N ratio if the bit error probability of the transmission p is to satisfy the condition $p \leq p_{max}$. The higher reliability of the symbols transmitted below $F_G$ is not exploited in the traditional method outlined in FIG. 8.

Due to the uniformization according to the present invention, however, the frequency range up to the frequency $F_{G1}$ can be used. When the frequency range up to $F_{G1}$ is used, more than K symbols can then be transmitted with the required minimum reliability $p \leq p_{min}$.

If a certain application using traditional DMT methods is to make use of the higher reliability of the symbols transmitted below $F_G$, this higher reliability can be achieved in the method according to the present invention by employing an FEC method in that all or part of the information transmitted in the frequency range between $F_G$ and $F_{G1}$ is used as (additional) redundancy.

It is apparent from FIG. 8, FIG. 3 and in particular FIG. 4 that the method of increasing the usable frequency range or the usable information rate by uniformization described hitherto does not yet lead to a reduction in the bit loading factor.

According to a further embodiment of the present invention such a reduction is preferred, since the high bit loading factors in the lower partial channels are chiefly instrumental in determining the implementation outlay for the requisite D/A and A/D conversions and the arithmetic. A reduction in the bit loading factors is possible if the uniformization extends over a wider frequency range or, in the limiting case, over the whole channel, the limiting case being marked by the fact that there are only two sets of partial channels, two combiners and two encoders.

Figure 5:
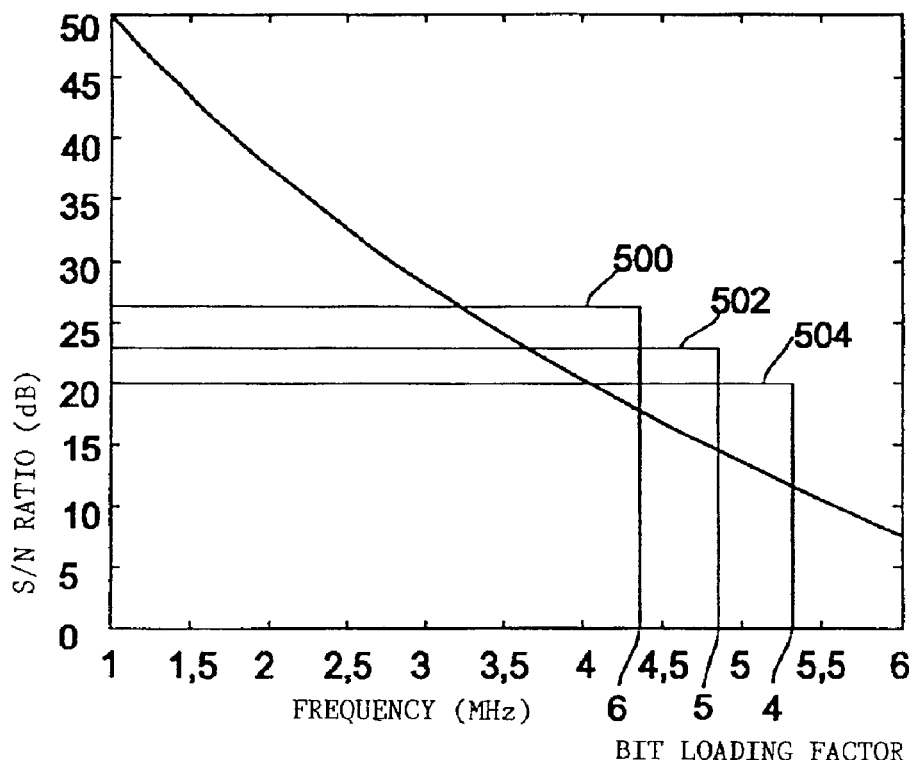
FIG. 5 shows the minimum signal-to-noise ratio of the transmission channel for a certain receive reliability as a function of the frequency and also the threshold signal-to-noise ratio of the different coding methods and the usable carrier occupancy according to another embodiment of the present invention in which small bit loading factors are desired.
Figure 6:
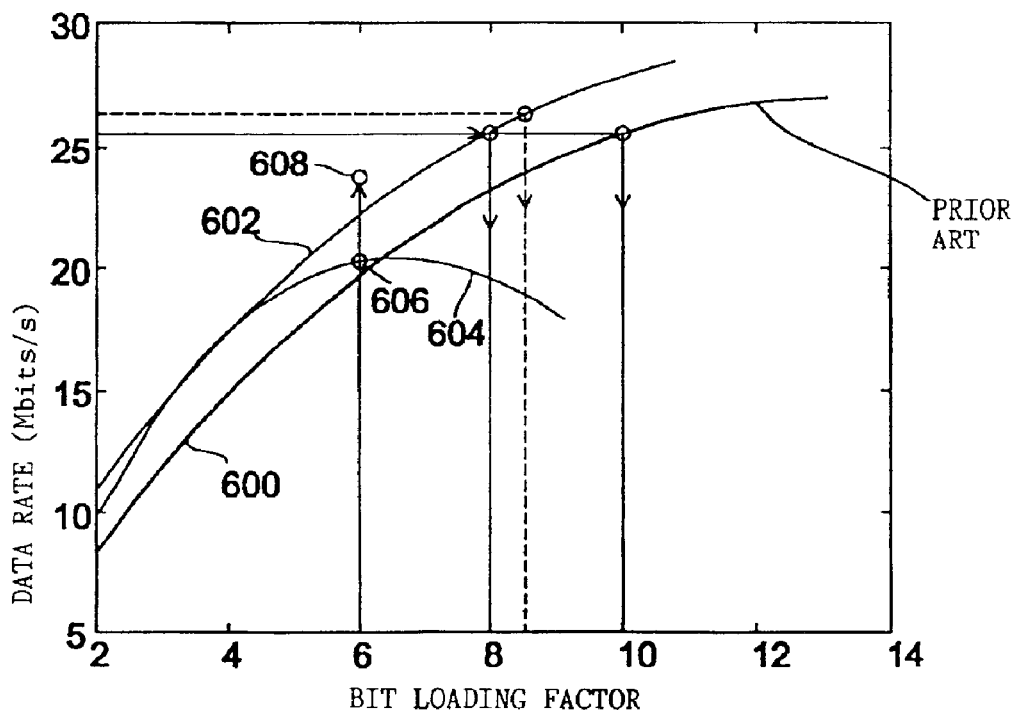
FIG. 6 shows how the achievable data rate varies with maximum bit loading factor for the traditional carrier occupancy sketched in FIG. 8, for the carrier occupancy according to the first embodiment of the present invention sketched in FIG. 3, and for the carrier occupancy according to the second embodiment of the present invention sketched in FIG. 5.
Figure 7:
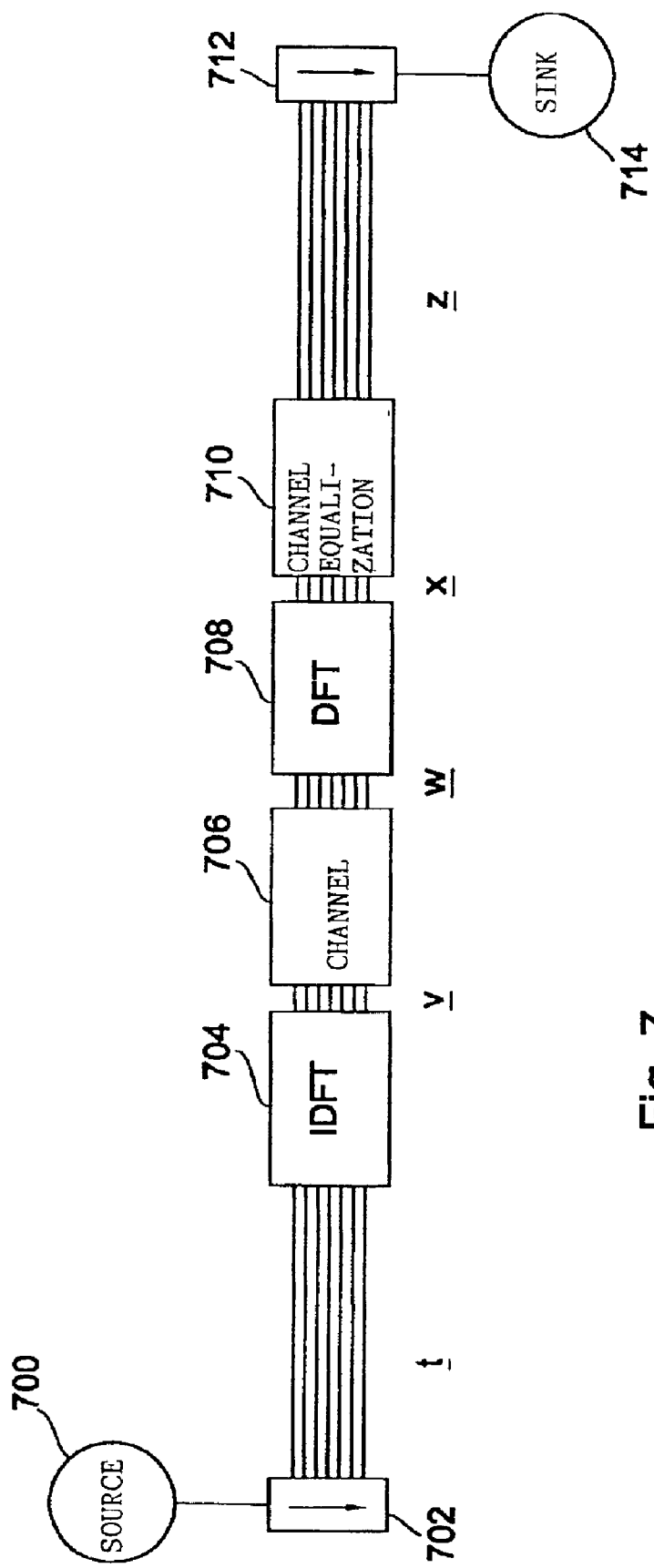
FIG. 7 shows a traditional OFDM transmission path.

FIG. 6 depicts the relationship between the achievable data rates (ordinate) and the specifiable maximum bit loading factors (abscissa) for the two strategies "uniformization over several partial bands" and "uniformization over the whole channel". In FIG. 6 there are two curves which increase monotonically from bottom left to top right and also a parabolic curve. The lower monotonically increasing curve shows the transmission rates achievable with the traditional method of FIG. 8 and the upper monotonically increasing curve those achievable with the novel method of FIG. 3, when the bit loading factors are restricted to a specified maximum value. The parabolic curve shows the transmission rates resulting from uniformization of the whole transmission channel; see also FIG. 5, which shows an alternative carrier occupancy for the COFDM method.

The point labelled 606 in FIG. 6 relates to the case in which the first set of partial channels has a bit loading factor of 6, giving a data rate of about 20 Mbits/s. The bandwidth of the carriers used in the first set of partial channels ranges from 1 MHz to about 4.3 MHz, as is indicated at the bottom of FIG. 5. This corresponds to the curve 500 in FIG. 5. It should be noted that there still remains in the transmission channel a frequency band from 4.3 to 5.3 MHz which can no longer be occupied with a bit loading factor of 6, despite combination. According to the present invention a second set of partial channels is therefore introduced, which is positioned above the carrier frequency 4.3 MHz and which extends to about 5.3 MHz if the second coding method has a bit loading factor of 3. However, in the interests of clarity, the second set is not included in the figure. The point labelled 608 in FIG. 6 takes account of the contribution of the second set of partial channels to the data rate. A comparison of the points 608 and 606 shows that, compared with the case where the whole transmission channel is uniformized, a significant data rate gain can be achieved through the method according to the present invention of using at least two sets of partial channels, which are encoded and combined differently. It should be noted that the combination of the whole transmission channel and the use of just one coding method leads to an undesirable restriction in the exploitable bandwidth, as can be seen from FIG. 5.

If a certain transmission rate forms the design criterion for a transmission system, it can be seen from FIG. 6 that the new system makes possible a significant reduction in the necessary maximum bit loading factor at high transmission rates. In the case where the gross transmission rates are the same in the two systems (the same net transmission rates and the same redundancy for the FEC), the situation can be seen clearly by drawing a horizontal line having the specified data rate as the value of the ordinate. The abscissa values of the meeting points of the two curves and the straight line represent the necessary bit loading factors. As can be seen at once, the new system intrinsically requires lower bit loading factors. The difference in the bit loading factors becomes increasingly significant as the data rate increases.

In the case where the same bit loading factors are specified for both systems, the gross transmission rates are always higher for the embodiment according to the present invention which aims for the lowest possible bit loading factors. This can be seen by imagining a vertical line in FIG. 6 which meets the abscissa at a particular value of the bit loading factor upper right section in the diagram, the rates for the novel system always lie well above the rates for traditional methods. Even after deducting an additional FEC redundancy of the order of 1% to 3% for the system according to the present invention with FEC redundancy, there is still a significant net rate gain.

A further possibility which presents itself is to shift the whole frequency range or just $F_{G1}$ downwards or to contract the bandwidth of the individual sets of partial channels until the same net transmission rates are achieved. As a result of the lower cable attenuation in the lower frequency range a greater distance could then be spanned.

Finally, it should be noted that it is only in the area of very high data rates, at the upper right in FIG. 6, that the differences in the attainable gross transmission rates are relatively insignificant for the same bit loading factors. This small difference is a consequence of the fact that even the new method only exploits the available channel capacity to a certain extent, though it does this better than the traditional method (FIG. 8).

The parabola-shaped curve in FIG. 6 describes the case of uniformization of the whole transmission channel. The maximum and the breaking off of the curve at higher bit loading factors result from the markedly LP characteristic of the (cable) transmission channel. This will now be explained. The idea of the rate gain through uniformization rests on the fact that the S/N ratio is not the same in the whole frequency range (S/N=S(f)/N(f)) and in the lower frequency range it is mostly much higher than it need be for a particular bit loading factor. As a result it is possible to extend the usable frequency range, i.e. the frequency range in which $S(f)/N(f) \leq S/N_{min} = f(p_{max})$. The result is a constant $S/N = S/N_{min}$ over the whole averaged range (it should be noted that in all the equations, S=signal, C=carrier and N=noise):

$$\overline{\left[\frac{C}{N}\right]} = \frac{\overline{C}}{\overline{N}} = \frac{\frac{1}{F_2 - F_1} \int_{F_1}^{F_2} C(f)}{\frac{1}{F_2 - F_1} \int_{F_1}^{F_2} N(f)} \quad (17)$$

If frequency ranges with a higher than average amount of (noise) interference are included in this averaging, the S/N ratio resulting from the averaging through an orthogonal transformation is, on the whole, worse. This makes it necessary to reduce the bit loading factor, and the net result is that, despite the disturbed partial channels being occupied, the transmission rate is lower. It follows from this that it makes sense not to assign any set of partial channels to such heavily disturbed partial channels or to assign to them a set of partial channels which employs a correspondingly lower-stage coding method. If the bit loading factor used in defining the sets of partial channels is too small, even though this results in a greater usable bandwidth or a correspondingly large number of usable partial channels for this set of partial channels, the net result is a smaller usable data rate, which is proportional to the product of the number of partial channels of the set and the bit loading factor, for this set of partial channels. This corresponds to the falling part of the curve 604 on the left in FIG. 6. If, on the other hand, the bit loading factor chosen when defining the sets of partial channels is too large, this results in only a small usable bandwidth or a small number of partial channels in the set of partial channels, again resulting in only a small usable data rate for this set of partial channels. This corresponds to the falling part of the curve 604 on the right in FIG. 6. Depending on the transmission quality of the individual partial channels, there is an optimal bit loading factor for a first set of partial channels and a certain number of particular partial channels assigned to this first set of partial channels for which the transmission rate of this set of partial channels is a maximum. In the example it can be seen from FIG. 6 that there is an optimal bit loading factor of 6 and a resultant transmission rate of ca. 20 Mbits/s, given by the apex of the curve 604. From FIG. 5 it can be seen that this results in an occupied bandwidth extending from ca. 1 MHz to ca. 4.3 MHz. The remaining partial channels or unoccupied frequency ranges or partial channels can now be assigned to other sets of partial channels. If they are assigned to a second set of partial channels in the frequency range between ca. 4.3 MHz and ca. 5.3 MHz and if a coding method with a bit loading factor of 3 is used for this second set of partial channels, the resulting data rate for this second set of partial channels is about 3 Mbits/s. This is represented by the line connecting the points 606 and 608 in FIG. 6.

In this way, depending on the frequency dependent cable attenuation and indirectly on the length of the cable, an optimal first bit loading factor for the first set of partial channels and an optimal second bit loading factor for the second set of partial channels can be found.

From the form of the parabolic curve 604 in FIG. 6 it can be seen that by sacrificing (theoretical) transmission rate of the order of about 40% it is possible to implement very simple systems with low bit loading factors and high bandwidth efficiency (see FIGS. 8 and 5). According to the present invention the high bandwidth efficiency of these systems makes it possible, by using the unexploited upper frequency range, to increase the data transmission rate to values for which bit loading factors higher by a factor of 2 would be required in conventional systems. For example, with a maximum bit loading factor of 6 for a system with complete uniformization (FIG. 6) and using the upper frequency range (4.4 MHz . . . 5.4 MHz, see FIG. 4) for a method with bit loading factor 3, the result is a total data rate of 20 Mbits/s+3 Mbits/s=23 Mbits/s (point 608 in FIG. 6). This is a rate which requires a bit loading factor of 9 in traditional systems, as shown in FIG. 5.

The devices and methods according to the present invention make possible the efficient utilization of the channel capacity of e.g. noisy transmission channels for which the S/N ratio either decreases monotonically with the frequency, e.g. in xDSL channels, or which deteriorates within certain frequency ranges, e.g. in a radio channel or in various special cable channels with particular cabling structures or particular circuit features, especially in the power line channel, thus resulting in considerable implementation and cost benefits.

What is claimed is:

1. A device for transmitting information over a plurality of partial channels which have different transmission characteristics and which together form a transmission channel, comprising:

a unit for grouping (102) the information as assigned to the partial channels;

a unit for coding (103*a*) information assigned to a first set of partial channels by means of a first coding method to obtain a first set of coded information symbols, where a first coded information symbol of the first set of coded information symbols has a first amount of information assigned to said first coded information symbol;

a unit for coding (103*b*) information assigned to a second set of partial channels by means of a second coding method to obtain a second set of coded information symbols, where a second coded information symbol of the second set of coded information symbols has a second amount of information assigned to said second coded information symbol which differs from the first amount of information;

a unit for combining (104*a*) the coded information symbols of the first set according to a first combination specification so as to generate a first set of combined coded information symbols equal in number to the number of partial channels of the first set of partial channels;

a unit for combining (104*b*) the coded information symbols of the second set according to a second combination specification so as to generate a second set of combined coded information symbols equal in number to the number of partial channels of the second set of partial channels; and a unit for assigning (106) the combined coded information symbols of the first set to the first set of partial channels and for assigning the combined coded information symbols of the second set to the second set of partial channels in such a way that each partial channel has a combined coded information symbol assigned to said each partial channel, that each partial channel of the first set of partial channels has the whole information of the information symbols of the first set assigned to said each partial channel of the first set of partial channels, and that each partial channel of the second set of partial channels has the whole information of the information symbols of the second set assigned to said each partial channel of the second set of partial channels;

where both the first and the second set of partial channels have at least one partial channel whose signal-to-noise ratio without combining would be lower than a threshold signal-to-noise ratio that is minimally necessary for the coding method used by the set to which this partial channel belongs in order to achieve a predetermined reliability when decoding the information symbols, and whose signal-to-noise ratio as a result of combining is greater than or equal to the threshold signal-to-noise ratio.

2. A device according to claim 1, wherein each partial channel of the transmission channel has a carrier with its own frequency assigned to said each partial channel of the transmission channel and wherein the unit for assigning has a unit (106) for impressing the combined coded information symbols on the corresponding carriers so as to generate a modulated signal representing the sequence of information symbols.

3. A device according to claim 1 or 2, wherein the first coding method (103*a*) is a method with a $2^x$-stage quantization of the signal space and wherein the second coding method (103*b*) is a method with a $2^{x-y}$ quantization of the signal space, where x=3, x>y.

4. A method according to claim 3, wherein the number of partial channels in a set of partial channels is so chosen that the excess in the signal-to-noise ratio of carriers in the set is essentially completely used to compensate for the deficit in the signal-to-noise ratio of the at least one partial channel in the set in such a way that all the partial channels in the set have a signal-to-noise ratio which is greater than the threshold signal-to-noise ratio and which is as close as possible to the threshold signal-to-noise ratio.

5. A method according to claim 3 or 4, wherein the transmission channel (108) has a plurality of carriers with carrier frequencies from a lower threshold frequency to a higher threshold frequency, where the first set of partial channels has carrier frequencies from the lower threshold frequency up to and including a middle frequency and where the second set of partial channels has carrier frequencies above the middle frequency up to the upper threshold frequency and where the middle frequency is so specified that for the parameter x=3 the signal-to-noise ratio of the carrier with the middle frequency is closest to the threshold signal-to-noise ratio (300) for the first set of partial channels as a result of combining by means of the first combination specification (104a) and where the upper threshold frequency is so specified that the signal-to-noise ratio of the carrier with carrier frequency equal to the upper threshold frequency is closest to the threshold signal-to-noise ratio for the second set of partial channels.

6. A method according to claim 3, wherein the transmission channel has a plurality of carriers with carrier frequencies from a lower threshold frequency to an upper threshold frequency, where there is a number of units for encoding and an equally large number of units for combining the coded information symbols for the respective sets of partial channels, the number being so chosen that, for the set with the upper threshold frequency, a coding method with the coarsest possible quantization is employed in the respective coding unit and where a coding method which is successively a stage finer for smaller carrier frequencies is employed in a respective coding unit, so that, for the carrier at the lower threshold frequency, a coding unit is employed whose quantization is as fine as possible, with the result that the data rate for the full bandwidth of the channel from the lower threshold frequency to the upper threshold frequency is a maximum.

7. A device according to one of the preceding claims, which also has a unit for performing a forward error correction for partial channels, where the unit for performing a forward error correction is so designed that part of the gain in data rate is used to introduce redundancy into the sequence of information symbols, whereas the rest of the gain in data rate is used to increase the information rate.

8. A device according to one of the previous claims, wherein the transmission characteristics of the partial channels, which affect the threshold signal-to-noise ratio, are known, where the amounts of information of the first and the second coding unit (103a, 103b) are specified from the start in order to be able to transmit a certain information rate.

9. A device according to one of the claims 1 to 7, wherein the transmission characteristics of the partial channels, which affect the threshold signal-to-noise ratio, can be estimated roughly, so that the amounts of information and an assignment of partial channels to the first and second set of partial channels are so chosen that, as a result of combining, the signal-to-noise ratios of the partial channels exceed the estimated threshold signal-to-noise ratios for the partial channels by a security margin.

10. A device according to one of the preceding claims, wherein a partial channel which is known to have a poor transmission characteristic is not assigned to any set of partial channels.

11. A device according to one of the preceding claims, wherein the partial channels are assigned to the sets of partial channels according to their transmission characteristics, which are known beforehand, so that a set of partial channels has partial channels with similar transmission characteristics.

12. A device according to one of the claims 1 to 10, which also has a unit for dynamically registering the transmission channel and which also has a unit for dynamically determining the amount of information which is assigned by the first and second coding unit (103a, 103b) and for dynamically assigning carriers to the first and second set of partial channels, so that, as a result of combining, the signal-to-noise ratios of the partial channels are always greater than or equal to the threshold signal-to-noise ratios.

13. A device according to claim 2, wherein the unit (106) for impressing the combined information symbols on the corresponding carriers has a unit for performing an inverse discrete Fourier transform (IDFT), which is preferably implemented in the form of a fast discrete inverse Fourier transform (fast DIFT).

14. A device according to one of the preceding claims, wherein the first and the second combination specification of the units for combining (104a, 104b) are combination specifications for combining the information symbols in an essentially orthogonal and essentially normalized, i.e. in an essentially orthonormal or unitary, way.

15. A device according to claim 14, wherein the first and the second combination specification are a Hadamard matrix or a pseudo random noise matrix (P) or some other sufficiently orthonormal or unitary matrix (P) whose matrix elements are equal to or close to 1.

16. A device for receiving a transmitted signal with information, where a first set of coded information symbols of the transmitted signal is generated by a first coding method, where the first coding method has assigned a first amount of information to a coded information symbol of the first set of coded information symbols, and where a second set of coded information symbols is generated by a second coding method, where the second coding method has assigned a second amount of information, different from the first amount of information, to a coded information symbol of the second set of coded information symbols, where coded information symbols of the first set are combined according to a first combination specification and coded information symbols of the second set are combined according to a second combination specification, where combined coded information symbols of the first set are assigned to a first set of partial channels and where combined coded information symbols of the second set are assigned to a second set of partial channels, where both the first and the second set of partial channels have at least one partial channel whose signal-to-noise ratio without the step of combining would be lower than a threshold signal-to-noise ratio which is minimally necessary for the coding method used by the set to which this partial channel belongs in order to achieve a predetermined reliability when decoding the information symbols and whose signal-to-noise ratio with the step of combining is greater than or equal to the threshold signal-to-noise ratio, comprising:

a unit for extracting (110) the combined coded information symbols of the partial channels from the received signal using the partial channels;

a first unit for processing (114a) the combined coded information symbols of the first set using a first processing specification, which is the inverse of the first combination specification, so as to obtain the coded information symbols of the first set;

a second unit for processing (114b) the combined coded
  information symbols of the second set using a second
  processing specification, which is the inverse of the
  second combination specification, so as to obtain the
  coded information symbols of the second set;
a first unit for decoding (115a) the coded information
  symbols of the first set so as to recapture the information
  assigned to the coded information symbols of the
  first set, the first unit for decoding being designed to
  also decode the at least one partial channel of the first
  set of partial channels; and
a second unit for decoding (115b) the coded information
  symbols of the second set so as to recapture the
  information assigned to the coded information symbols
  of the second set, the second unit for decoding being
  designed to also decode the at least one partial channel
  of the second set of partial channels.

17. A device according to claim 16, wherein the unit (110) for extracting the combined coded information symbols has a unit for performing a discrete Fourier transform (DFT), which is preferably implemented in the form of a fast Fourier transform (FFT).

18. A device according to claim 14 or 15, wherein the first and the second combination specification are combination specifications for combining the information symbols in an essentially orthogonal and essentially normalized, i.e. in an essentially orthonormalized or unitary, way, and wherein the first and the second processing specification are the inverses of these combination specifications.

19. A device according to claim 18, wherein the first and the second processing specification are inverse Hadamard matrices or inverse pseudo random noise matrices or some other sufficiently orthonormal or unitary matrices which are sufficiently inverse to the combination specification and whose matrix elements are equal to or close to 1.

20. A device according to claim 16, which also has a unit for equalizing the received signal which is so designed that said unit for equalizing normalizes the amplitudes of the signals of the partial channels, the unit for equalizing following the unit for extracting the combined coded information symbols.

21. A method for transmitting information over a plurality of partial channels which have different transmission characteristics and together form a transmission channel, with the following steps:
  grouping (102) the information as assigned to the partial channels;
  coding (103a) information assigned to a first set of partial channels by means of a first coding method to obtain a first set of coded information symbols, where a first coded information symbol of the first set of coded information symbols has a first amount of information assigned to said first coded information symbol;
  coding (103b) information assigned to a second set of partial channels by means of a second coding method to obtain a second set of coded information symbols, where a second coded information symbol of the second set of coded information symbols has a second amount of information assigned to said second coded information symbol which differs from the first amount of information;
  combining (104a) the coded information symbols of the first set according to a first combination specification so as to generate a first set of combined coded information symbols equal in number to the number of partial channels of the first set of partial channels;
  combining (104b) the coded information symbols of the second set according to a second combination specification so as to generate a second set of combined coded information symbols equal in number to the number of partial channels of the second set of partial channels; and
  assigning (106) the combined coded information symbols of the first set to the first set of partial channels and assigning the combined coded information symbols of the second set to the second set of partial channels in such a way that each partial channel has a combined coded information symbol assigned to said each partial channel, that each partial channel of the first set of partial channels has the whole information of the information symbols of the first set assigned to said each partial channel of the first set of partial channels, and that each partial channel of the second set of partial channels has the whole information of the information symbols of the second set assigned to said each partial channel of the second set of partial channels;
  where both the first and the second set of partial channels have at least one partial channel whose signal-to-noise ratio without combining would be lower than a threshold signal-to-noise ratio that is minimally necessary for the coding method used by the set to which this partial channel belongs in order to achieve a predetermined reliability when decoding the information symbols, and whose signal-to-noise ratio as a result of combining is greater than or equal to the threshold signal-to-noise ratio.

22. A method for receiving a transmitted signal with information, where a first set of coded information symbols of the transmitted signal is generated by a first coding method, where the first coding method has assigned a first amount of information to a coded information symbol of the first set of coded information symbols, and where a second set of coded information symbols is generated by a second coding method, where the second coding method has assigned a second amount of information, different from the first amount of information, to a coded information symbol of the second set of coded information symbols, where coded information symbols of the first set are combined according to a first combination specification and coded information symbols of the second set are combined according to a second combination specification, where combined coded information symbols of the first set are assigned to a first set of partial channels and where combined coded information symbols of the second set are assigned to a second set of partial channels, where both the first and the second set of partial channels have at least one partial channel whose signal-to-noise ratio without the step of combining would be lower than a threshold signal-to-noise ratio which is minimally necessary for the coding method used by the set to which this partial channel belongs in order to achieve a predetermined reliability when decoding the information symbols and whose signal-to-noise ratio with the step of combining is greater than or equal to the threshold signal-to-noise ratio, with the following steps:
  extracting (110) the combined coded information symbols of the partial channels from the transmitted signal using the partial channels;
  processing (114a) the combined coded information symbols of the first set using a first processing specification, which is the inverse of the first combination specification, so as to obtain the coded information symbols of the first set;
  processing (114b) the combined coded information symbols of the second set using a second processing specification, which is the inverse of the second combination specification, so as to obtain the coded information symbols of the second set;

decoding (115a) the coded information symbols of the first set so as to recapture the information assigned to the coded information symbols of the first set, the first unit for decoding being designed to also decode the at least one partial channel of the first set of partial channels; and decoding (115b) the coded information symbols of the second set so as to recapture the information assigned to the coded information symbols of the second set, the second unit for decoding being designed to also decode the at least one partial channel of the second set of partial channels.

23. A method according to claim 22, which also has the following step preceding the processing steps:

normalizing (112) the partial channels in such a way that, following normalization, the value of the power is substantially the same for each partial channel.

* * * * *